(12) United States Patent
Tsuchida et al.

(10) Patent No.: US 9,569,160 B2
(45) Date of Patent: Feb. 14, 2017

(54) DISPLAY PROCESSING DEVICE AND IMAGING APPARATUS

(71) Applicant: OLYMPUS CORPORATION, Tokyo (JP)

(72) Inventors: Ryusuke Tsuchida, Tokyo (JP); Akira Ueno, Tokyo (JP)

(73) Assignee: OLYMPUS CORPORATION, Tokyo (JP)

( * ) Notice: Subject to any disclaimer, the term of this patent is extended or adjusted under 35 U.S.C. 154(b) by 6 days.

(21) Appl. No.: 14/683,459

(22) Filed: Apr. 10, 2015

(65) Prior Publication Data
US 2015/0332431 A1 Nov. 19, 2015

(30) Foreign Application Priority Data

May 14, 2014 (JP) ................. 2014-100684

(51) Int. Cl.
| | |
|---|---|
| G09G 5/00 | (2006.01) |
| G06F 3/14 | (2006.01) |
| G06T 3/40 | (2006.01) |
| G09G 5/393 | (2006.01) |
| G06T 1/60 | (2006.01) |
| G09G 5/18 | (2006.01) |
| H04N 5/04 | (2006.01) |

(Continued)

(52) U.S. Cl.
CPC ............... *G06F 3/14* (2013.01); *G06F 3/1431* (2013.01); *G06T 1/60* (2013.01); *G06T 3/40* (2013.01); *G09G 5/18* (2013.01); *G09G 5/393* (2013.01); *H04N 5/04* (2013.01); *H04N 5/225* (2013.01); *G06F 3/0481* (2013.01); *G09G 2340/0407* (2013.01); *G09G 2340/0414* (2013.01)

(58) Field of Classification Search
CPC ............... G09G 2340/0407; G09G 2340/0414; G06T 3/40; G06F 3/0481; G06F 2203/04806
See application file for complete search history.

(56) References Cited

U.S. PATENT DOCUMENTS

| | | | | |
|---|---|---|---|---|
| 5,774,131 A | * | 6/1998 | Kim ........................ | G06F 3/162 345/503 |
| 6,867,759 B1 | * | 3/2005 | Baek ..................... | G09G 3/3611 345/98 |

(Continued)

FOREIGN PATENT DOCUMENTS

JP 2006-53527 A 2/2006

*Primary Examiner* — Abderrahim Merouan
(74) *Attorney, Agent, or Firm* — Westerman, Hattori, Daniels & Adrian, LLP

(57) ABSTRACT

A display processing device includes: a first display processing unit that outputs image data of a first output image obtained by performing display processing on display image data of an odd column of a display image; a second display processing unit that outputs image data of a second output image obtained by performing the display processing on display image data of an even column of the display image; an output selection unit that selects the image data of the first output image or the image data of the second output image and outputs the selected image data to a first display device that displays a display image; and a clock control unit that supplies an operation clock required when the respective elements operate.

7 Claims, 5 Drawing Sheets

(51) Int. Cl.
*H04N 5/225* (2006.01)
*G06F 3/0481* (2013.01)

(56) References Cited

U.S. PATENT DOCUMENTS

| | | | | |
|---|---|---|---|---|
| 7,773,048 B2* | 8/2010 | Shiraishi | ............ | G09G 3/3611 345/1.1 |
| 7,903,073 B2* | 3/2011 | Chung | ............ | G09G 3/2096 345/103 |
| 2003/0214473 A1* | 11/2003 | Lee | ............ | G09G 3/3648 345/87 |
| 2006/0007114 A1* | 1/2006 | Shiraishi | ............ | G09G 3/3611 345/103 |
| 2009/0074052 A1* | 3/2009 | Fukuhara | ............ | H04N 19/63 375/240.01 |
| 2009/0092326 A1* | 4/2009 | Fukuhara | ............ | H04N 19/139 382/233 |
| 2011/0055317 A1* | 3/2011 | Vonog | ............ | G06F 9/5072 709/203 |
| 2012/0133736 A1* | 5/2012 | Nishi | ............ | H04N 13/0048 348/43 |
| 2012/0249854 A1* | 10/2012 | Miyakawa | ............ | H04N 5/23212 348/333.01 |
| 2013/0147708 A1* | 6/2013 | Imamura | ............ | G06F 3/041 345/157 |
| 2013/0223711 A1* | 8/2013 | Knapp | ............ | G06K 9/62 382/131 |
| 2013/0232407 A1* | 9/2013 | Onuma | ............ | G06F 17/30011 715/251 |
| 2014/0059317 A1* | 2/2014 | Okajima | ............ | G06F 12/02 711/165 |
| 2014/0138520 A1* | 5/2014 | Liu | ............ | H01L 27/14618 250/208.1 |
| 2015/0332432 A1* | 11/2015 | Tsuchida | ............ | G09G 5/12 345/660 |

* cited by examiner

DISPLAY PROCESSING DEVICE AND IMAGING APPARATUS

BACKGROUND OF THE INVENTION

Field of the Invention

The present invention relates to a display processing device and an imaging apparatus.

Priority is claimed on Japanese Patent Application No. 2014-100684, filed May 14, 2014, the content of which is incorporated herein by reference.

DESCRIPTION OF RELATED ART

Imaging apparatuses such as cameras for still images or cameras for moving images generally have a function of displaying captured images on display devices. As the display devices, for example, there are display devices mounted in imaging apparatuses, such as thin film transistor (TFT) liquid crystal displays (LCDs) or electronic view finders (EVFs). In addition, there are external display devices (external displays) connected to imaging apparatuses, such as televisions (TVs), TFT monitors, or organic electro luminescence (EL) displays. As described above, as the display devices used to display images captured by the imaging apparatuses, there are various types of display devices having different frame rates or resolutions. Therefore, there is a demand for display processing devices provided in the imaging apparatuses and outputting image signals for display on display devices to be able to output image signals to various types of display devices. Furthermore, among the display processing devices, there are display processing devices employing a configuration including a plurality of display processing units in order to be able to simultaneously output image signals to a plurality of display devices.

In recent years, with the high definition of display devices, for example, TVs of a full HD size (1920×1080) (high definition TVs (HDTVs)) with higher definition than conventional TVs of a VGA size (640×480) have become mainstream in the field of TVs. Furthermore, recently, TVs of a 4K2K size (3840×2160) (ultra high definition TVs (UHDTVs)) with further higher definition have been commercialized. Therefore, there is a demand for display processing devices provided in imaging apparatuses to have further high performance.

For example, the case in which a display processing device that outputs an image signal of 60 frames per second (fps) with a full HD-size is adapted to be able to output an image signal of the 4K2K size at the same frame rate (that is, 60 fps) will be considered. In this case, in the 4K2K size, since the number of pixels to be displayed is four times that of the full HD size, a frequency of a clock (an operation clock) by which the display processing device operates is required to be four times that of the full HD size. Therefore, in the display processing device, the frequency of the operation clock becomes high, resulting in an increase in power consumption. Furthermore, in the development of the display processing device, since the display processing device is adapted to handle the high frequency of the operation clock, it is difficult to optimize operation timings of respective elements of the display processing device, that is, circuits for realizing the functions of the display processing device, and thus it is not easy to develop the display processing device.

For example, Japanese Unexamined Patent Application, First Publication No. 2006-053527 discloses a technology of a display processing device in which an entire area of an image of one frame is divided into a plurality of areas and the divided areas are processed in a parallel manner. In the technology disclosed in Japanese Unexamined Patent Application, First Publication No. 2006-053527, two display processing units are provided in the display processing device, an image area of one frame to be displayed is divided into right and left areas, and the respective display processing units process the left half image and the right half image in a parallel manner. In the technology disclosed in Japanese Unexamined Patent Application, First Publication No. 2006-053527, image signals processed by the respective display processing units are input in a parallel manner to a display device capable of receiving two image signals in a parallel manner, so that the entire image of one frame is displayed.

As described above, in the technology disclosed in Japanese Unexamined Patent Application, First Publication No. 2006-053527, the image area of one frame is divided into a plurality of areas to limit an increase in image areas to be processed by the respective display processing units, and the plurality of display processing units corresponding to the respective areas perform processing on the respective corresponding image areas in a parallel manner, so that a high definition image is displayed on a display device.

As the point of view of the technology disclosed in Japanese Unexamined Patent Application, First Publication No. 2006-053527 is used, a display processing device that outputs an image signal of the full HD size can be adapted to be able to output an image signal of the 4K2K size. In more detail, two display processing units corresponding to the full HD size are provided in the display processing device, an image of the 4K2K size is divided into two right and left images, and the respective display processing units process the left half image and the right half image in a parallel manner. In this way, the area of the images processed by the respective display processing units can be reduced to ½ and the frequency of an operation clock of the respective display processing units is increased twofold, so that it is possible to realize a display processing device that outputs an image signal of the 4K2K size.

SUMMARY OF THE INVENTION

According to a first aspect of the present invention, a display processing device that performs predetermined display processing on image data of a display image of a predetermined first size input to the display processing device, includes: a first display processing unit that outputs image data of a first output image obtained by performing the display processing on display image data of an odd column of a display image of a second size larger than the first size, when the display image of the second size is input to the first display processing unit; a second display processing unit that outputs image data of a second output image obtained by performing the display processing on display image data of an even column of the display image of the second size; an output selection unit that selects the image data of the first output image or the image data of the second output image, and outputs the selected image data to a first display device that displays the display image of the second size; and a clock control unit that generates and supplies an operation clock required when the first display processing unit and the second display processing unit operate.

According to a second aspect of the present invention, in the display processing device according to the first aspect, the first display processing unit may acquire the display image data of the odd column by a direct memory access (DMA) and notify the second display processing unit of a timing at which the display image data of the even column is acquired by the DMA.

According to a third aspect of the present invention, in the display processing device according to the first aspect or the second aspect, the first display processing unit may include: a first synchronization signal generation block that generates and outputs a synchronization signal required when the first display device displays an image corresponding to output image data output from the output selection unit, and generates and outputs a first trigger signal representing a first timing at which acquisition of the display image data of the odd column by the DMA is started and a second trigger signal representing a second timing at which acquisition of the display image data of the even column by the DMA is started, on the basis of the operation clock supplied from the clock control unit; a first input control block that acquires the display image data of the odd column by the DMA in response to the first trigger signal; and a first display processing block that outputs the image data of the first output image obtained by performing the display processing on the display image data of the odd column acquired by the first input control block. The second display processing unit may include: a second synchronization signal generation block that generates a synchronization signal required when a second display device, which is handled by the second display processing unit independently, displays an image corresponding to output image data output from the second display processing unit, and generates and outputs a third trigger signal representing a third timing at which acquisition of the image data of the display image of the first size, which is handled by the second display processing unit independently, by the DMA is started, on the basis of the operation clock supplied from the clock control unit; a synchronization signal selection block that selects any one of the second trigger signal and the third trigger signal and outputs the selected trigger signal as a fourth trigger signal; a second input control block that acquires the display image data of the even column or the image data of the display image of the first size, which is handled by the second display processing unit independently, by the DMA in response to the fourth trigger signal; and a second display processing block that outputs the display image data of the even column acquired by the second input control block or the image data of the second output image obtained by performing the display processing on the image data of the display image of the first size, which is handled by the second display processing unit independently.

According to a fourth aspect of the present invention, in the display processing device according to the third aspect, the clock control unit may generate a display device clock of a frequency required when the first display device displays an image corresponding to one pixel, and generate the operation clock with the same phase as the generated display device clock.

According to a fifth aspect of the present invention, in the display processing device according to the fourth aspect, on the basis of the synchronization signal output by the first display processing unit and corresponding to the first display device, the output selection unit may determine a period in which the first display device displays an image, alternately select the image data of the first output image and the image data of the second output image at each timing of the display device clock for the determined period in which the first display device displays the image, and output the selected image data to the first display device at a timing of the display device clock.

According to a sixth aspect of the present invention, in the display processing device according to the fourth aspect, on the basis of the synchronization signal output by the first display processing unit and corresponding to the first display device, the output selection unit may determine a period in which the first display device displays an image, simultaneously select the image data of the first output image and the image data of the second output image at a timing of the operation clock for the determined period in which the first display device displays the image, and output the selected image data to respective corresponding input systems provided in the first display device at the timing of the operation clock.

According to a seventh aspect of the present invention, an imaging apparatus may include the display processing device according to any one of the first aspect to the sixth aspect.

DETAILED DESCRIPTION OF THE INVENTION

Figure 1:
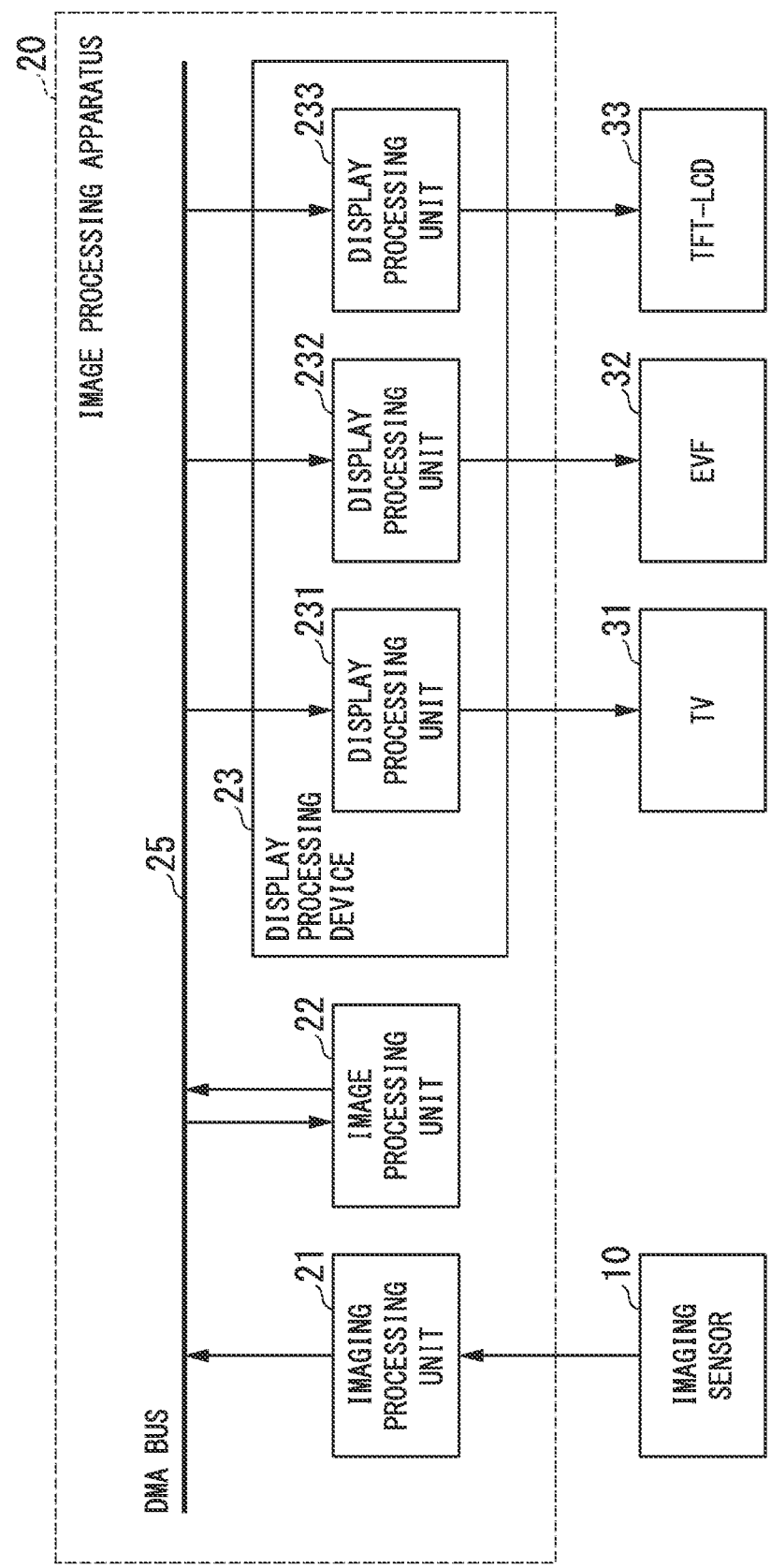
FIG. 1 is a block diagram showing an example of a configuration of a system provided with a display processing device according to an embodiment of the present invention.

Hereinafter, an embodiment of the present invention will be described with reference to the accompanying drawings. FIG. 1 is a block diagram showing an example of a configuration of a system provided with a display processing device according to an embodiment of the present invention. In addition, there is no limitation on the configuration of a system to which the display processing device according to the present embodiment is applied. FIG. 1 shows a configuration in which the display processing device according to the present embodiment is applied to a system of an imaging apparatus.

A system of an imaging apparatus 1 shown in FIG. 1 includes an imaging sensor 10, an image processing apparatus 20, a television (TV) 31, an EVF 32, and a TFT liquid crystal display (TFT-LCD) 33. The imaging apparatus 1 causes an image captured by the imaging sensor 10 to be displayed on connected display devices (the TV 31, the EVF 32, and the TFT-LCD 33).

The imaging sensor 10 is an image sensor represented as a charge coupled device (CCD) image sensor or a complementary metal-oxide semiconductor (CMOS) image sensor, which photoelectrically converts an optical image of an object which is formed by a lens (not shown). The imaging sensor 10 outputs a pixel signal corresponding to object light to the image processing apparatus 20.

The image processing apparatus 20 performs predetermined image processing on the pixel signal input from the imaging sensor 10. The image processing apparatus 20 performs display processing for the connected TV 31, EVF 32, and TFT-LCD 33 on an image subjected to the image processing, and causes the image to be displayed. The image processing apparatus 20 includes an imaging processing unit 21, an image processing unit 22, and a display processing device 23. Furthermore, in the image processing apparatus 20, the imaging processing unit 21, the image processing unit 22, and the display processing device 23 are connected to one another via a direct memory access (DMA) bus 25. Each of the imaging processing unit 21, the image processing unit 22, and the display processing device 23 performs data writing or data reading to a memory for temporary storage, such as a dynamic random access memory (DRAM, not shown) provided outside the image processing apparatus 20 and connected to the DMA bus 25, by DMA. That is, each of the imaging processing unit 21, the image processing unit 22, and the display processing device 23 in the image processing apparatus 20 exchanges image data to be processed among the elements thereof via the external DRAM (not shown) connected to the DMA bus 25.

The imaging processing unit 21 performs pre-processing such as flaw correction or shading correction on the image corresponding to the pixel signal input from the imaging sensor 10, and transmits (writes) image data (hereinafter referred to as "pre-processed image data") of the pre-processing result to (in) the DRAM (not shown) by the DMA.

The image processing unit 22 acquires (reads) the pre-processed image data recorded in the DRAM (not shown) by the DMA, performs various types of image processing such as noise elimination, YC conversion processing, and resize processing, and generates image data for display (hereinafter referred to as "display image data"). Then, the image processing unit 22 transmits (writes) the generated display image data to (in) the DRAM (not shown) by the DMA.

In addition, in the imaging apparatus 1, the image processing unit 22 can generate image data for recording by performing various types of image processing of JPEG compression processing, moving image compression processing such as MPEG compression processing and H.264 compression processing, and the like, on the pre-processed image data, and record the generated image data for recording on a recording medium (for example, an SD memory card, a Compact Flash (CF; registered trademark), and the like) detachable from the imaging apparatus 1. Also at this time, the image data for recording generated by the image processing unit 22 is recorded on the recording medium via the DRAM (not shown). Therefore, in the imaging apparatus 1, there are cases in which the image data for recording recorded on the recording medium is read and is transmitted (written) to (in) the DRAM (not shown). In this case, the image processing unit 22 can acquire (read) the image data for recording recorded on the DRAM (not shown) by the DMA, generate display image data by performing various types of image processing of JPEG expansion processing, moving image expansion processing such as MPEG expansion processing and H.264 expansion processing, and the like, and transmit (write) the generated display image data to (in) the DRAM (not shown) by the DMA again.

The display processing device 23 acquires (reads) the display image data recorded on the DRAM (not shown) by the DMA, and performs display processing, such as processing of superimposing data for on-screen display (OSD) display and color conversion processing corresponding to a connected display device, on the acquired display image data. Then, the display processing device 23 outputs the display-processed display image data (hereinafter referred to as "output image data") to display devices such as the TV 31, the EVF 32, and the TFT-LCD 33.

In addition, the display processing device 23 according to the present embodiment may be embedded in the image processing apparatus 20 mounted in the imaging apparatus 1 as shown in FIG. 1. However, for example, the display processing device 23 may also be independently mounted in the imaging apparatus 1.

The display processing device 23 includes three display processing units 231 to 233. In the following description, when the display processing units 231 to 233 are not distinguished from one another, they are called "display processing units 230."

Each of the display processing units 231 to 233 acquires (reads) display image data to be displayed on a connected display device from the DRAM (not shown) by the DMA, and performs display processing on the acquired display image data. Then, each of the display processing units 231 to 233 outputs the display-processed output image data to the connected display device. In the system of the imaging apparatus 1 shown in FIG. 1, the TV 31 is connected to the display processing unit 231, the EVF 32 is connected to the display processing unit 232, and the TFT-LCD 33 is connected to the display processing unit 233. In addition, each of the display processing units 231 to 233 has the same configuration. That is, each of the display processing units 231 to 233 can cause all connected display devices to display an image regardless of the type of the display processing unit 230.

In addition, the configuration and the operation of each of the display processing device 23 and the display processing unit 230 according to the present embodiment will be described in detail later.

The TV 31 is a TV that displays an image of a full HD size (1920×1080) (high definition TV (HDTV)). The TV 31 displays an image corresponding to the display-processed output image data output from the display processing unit 231. In addition, in FIG. 1, the TV 31 is also an element of the imaging apparatus 1; however, the TV 31 is detachable from the imaging apparatus 1.

The EVF 32, for example, is a small display device such as a TFT-LCD or an organic electro luminescence (EL) display. The EVF 32 displays an image corresponding to the display-processed output image data output from the display processing unit 232. The EVF 32 operates as a view finder mounted in the imaging apparatus 1 in order to check an image captured by the imaging sensor 10.

The TFT-LCD 33 is a medium-sized display device. The TFT-LCD 33 displays an image corresponding to the display-processed output image data output from the display processing unit 233. In addition, in FIG. 1, the TFT-LCD 33 is also an element of the imaging apparatus 1; however, the TFT-LCD 33 is detachable from the imaging apparatus 1.

With such a configuration, the imaging apparatus 1 can display images captured by the imaging sensor 10 on a plurality of display devices. That is, the imaging apparatus 1 can simultaneously display images corresponding to display-processed output image data on display devices equal in number to the display processing units 230 in the display processing device 23 provided in the image processing apparatus 20.

Furthermore, for example, a display device having a large number of pixels to be displayed, such as a TV that displays an image of a 4K2K size (3840×2160) (ultra high definition TV (UHDTV)), can be connected to the imaging apparatus 1. That is, a display device having a greater number of pixels than that handled by the respective display processing units 230 in the display processing device 23 can be connected to the imaging apparatus 1. In this case, a plurality of display processing units 230 operate in cooperation with one another in a parallel manner, so that the imaging apparatus 1 causes an image corresponding to display-processed output image data to be displayed on a display device that displays an image having a large number of pixels. When the plurality of display processing units 230 operate in cooperation with one another in a parallel manner, an exclusive relation is established between the output of display-processed output image data to display devices which are connected to the respective display processing units 230 and through which the respective display processing units 230 can independently display images, and the output of display-processed output image data to the display devices which are connected to the respective display processing units 230 and through which the respective display processing units 230 can display images by operating in cooperation with one another in a parallel manner.

Figure 2:
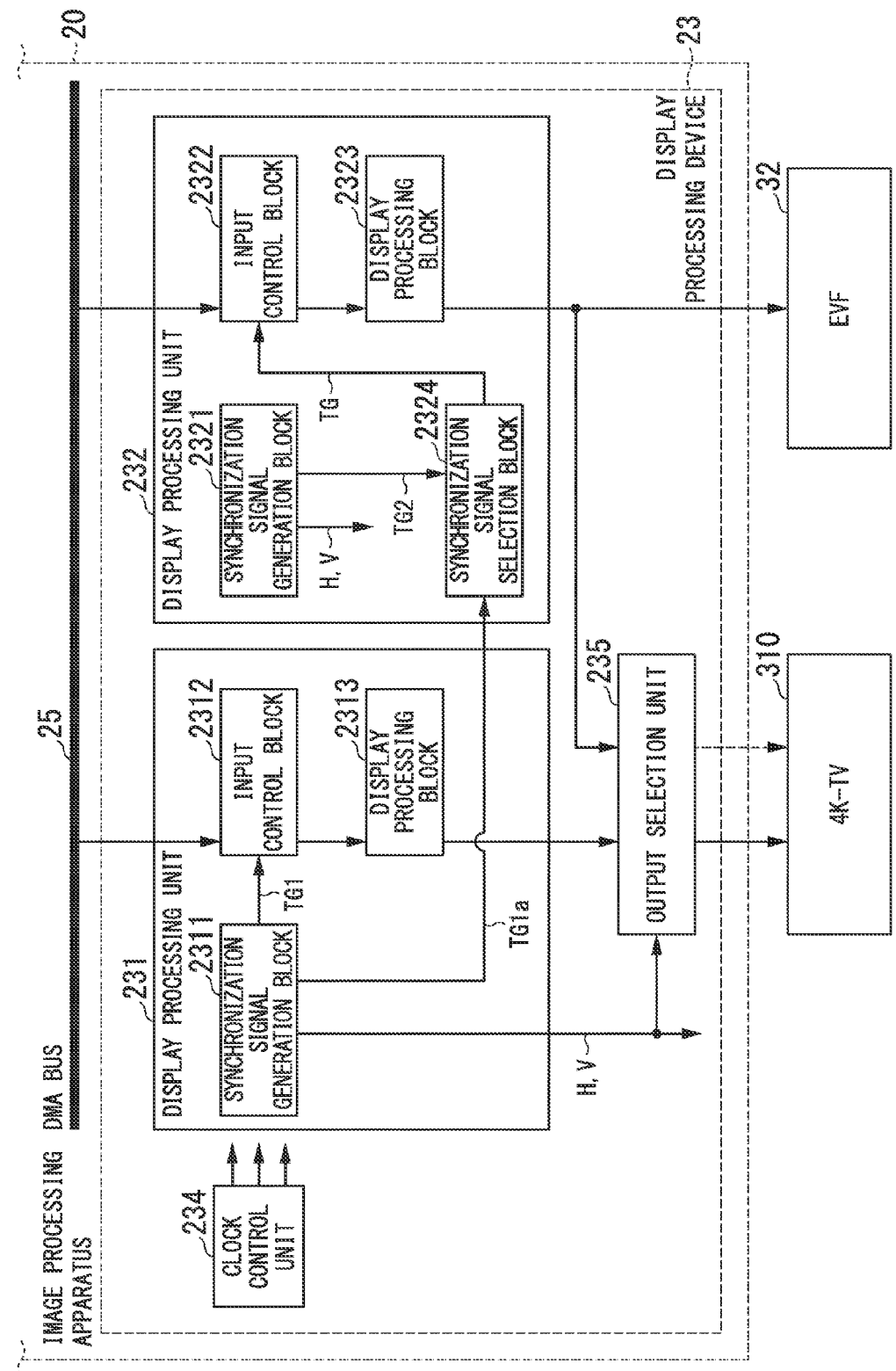
FIG. 2 is a block diagram showing a schematic configuration of the display processing device according to the present embodiment.

Next, the configuration and the operation of the display processing device 23 according to the present embodiment will be described. FIG. 2 is a block diagram showing a schematic configuration of the display processing device 23 according to the present embodiment. The following description will be provided for the configuration and the operation in which the two display processing units 231 and 232 corresponding to display devices that displays an image of a full HD size (1920×1080) are provided in the display processing device 23 included in the image processing apparatus 20, and the display processing units 231 and 232 output output image data in cooperation with each other to display devices that displays an image of a 4K2K size (3840×2160).

The display processing device 23 shown in FIG. 2 includes the display processing unit 231, the display processing unit 232, a clock control unit 234, and an output selection unit 235. A 4K TV (4K-TV) 310, which displays the image of the 4K2K size (3840×2160) and through which the display processing unit 231 and the display processing unit 232 display images in cooperation with each other, and the EVF 32, through which the display processing unit 232 independently displays images, are connected to the display processing device 23.

The 4K-TV 310 is a TV that displays the image of the 4K2K size (3840×2160). The 4K-TV 310 displays an image corresponding to the display-processed output image data output from the display processing device 23. In addition, the 4K-TV 310 is detachable from the imaging apparatus 1.

The display processing unit 231 and the display processing unit 232 sequentially acquire (read) display image data of respective frames to be displayed on connected display devices from the DRAM (not shown) connected to the DMA bus 25 by the DMA. Then, the display processing unit 231 and the display processing unit 232 sequentially output output image data obtained by performing display processing on the sequentially acquired display image data, to the connected display devices. At this time, each of the display processing unit 231 and the display processing unit 232 sequentially acquires (reads) the display image data of the respective frames to be displayed on the display devices from the DRAM (not shown) by the DMA in each row (line), and sequentially outputs the output image data obtained by performing the display processing on the display image data acquired in each line, to the connected display devices.

In the display processing device 23 shown in FIG. 2, as described above, the display processing unit 231 and the display processing unit 232 perform the display processing on display image data to be displayed on the 4K-TV 310 in cooperation with each other in a parallel manner. In more detail, after the display image data to be displayed on the 4K-TV 310 is divided in two in each column, the display processing unit 231 performs the display processing on one half of the divided display image data, and the display processing unit 232 performs the display processing on the other half of the divided display image data. In greater detail, the display image data of one frame to be displayed on the 4K-TV 310 is divided in two into display image data including pixel data of odd columns and display image data including pixel data of even columns. The display processing unit 231 performs the display processing on the display image data including the pixel data of odd columns, and the display processing unit 232 performs the display processing on the display image data including the pixel data of even columns.

The display processing unit 231 includes a synchronization signal generation block 2311, an input control block 2312, and a display processing block 2313. Furthermore, the display processing unit 232 includes a synchronization signal generation block 2321, an input control block 2322, a display processing block 2323, and a synchronization signal selection block 2324.

The synchronization signal generation block 2311 generates, for example, a synchronization signal, such as a vertical synchronization signal V or a horizontal synchronization signal H, which represents the timing at which an image corresponding to output image data is displayed on the display device connected to the display processing unit 231, on the basis of an operation clock supplied from the clock control unit 234. Then, the synchronization signal generation block 2311 outputs the generated synchronization signal to the display device connected to the display processing unit 231. Furthermore, the synchronization signal generation block 2311 outputs the generated synchronization signal to the output selection unit 235.

Furthermore, on the basis of the generated synchronization signal, the synchronization signal generation block 2311 generates a trigger signal TG1, which represents the timing at which display image data of one frame to be displayed on the display device connected to the display processing unit 231 is acquired from the DRAM (not shown) and display processing is started, that is, the start timing of the DMA, and outputs the generated trigger signal TG1 to the input control block 2312. The trigger signal TG1 represents the timing at which the acquisition of display image data corresponding to an initial pixel (that is, a left upper pixel of an image) in the display image data of one frame from the DRAM (not shown) is started.

Furthermore, on the basis of the generated synchronization signal, the synchronization signal generation block 2311 generates a trigger signal TG1a, which represents the timing at which the other display processing unit 230 operating in cooperation acquires corresponding display image data from the DRAM (not shown) and starts the display processing, that is, the start timing of the DMA, and outputs the generated trigger signal TG1a to a synchronization signal selection block in the other display processing unit 230. In the configuration shown in FIG. 2, the synchronization signal generation block 2311 outputs the trigger signal TG1a, which is used when the display processing unit 232 acquires corresponding display image data, to the synchronization signal selection block 2324 in the display processing unit 232. The output timing of the trigger signal TG1a represents the timing at which the other display processing unit 230 operating in cooperation starts to acquire display image data corresponding to an initial pixel in display image data including pixel data of a corresponding column from the DRAM (not shown).

In addition, when the display processing unit 231 and the display processing unit 232 operate in cooperation with each other in a parallel manner, the display processing unit 231 and the display processing unit 232 acquire display image data to be subjected to the display processing in synchronization with each other. Therefore, the trigger signal TG1 and the trigger signal TG1a generated by the synchronization signal generation block 2311 may be trigger signals representing the same timing.

The input control block 2312 starts the DMA, by which the display processing unit 231 acquires display image data to be subjected to the display processing, in response to the trigger signal TG1 input from the synchronization signal generation block 2311. Then, the input control block 2312 outputs the display image data acquired (read) from the DRAM (not shown) by the DMA, to the display processing block 2313 from a predetermined timing.

In addition, when the display processing unit 231 and the display processing unit 232 perform the display processing on the display image data to be displayed on the 4K-TV 310 in cooperation with each other, the input control block 2312 acquires (reads) display image data including pixel data of odd columns (hereinafter referred to as "odd column display image data") in the display image data to be displayed on the 4K-TV 310 from the DRAM (not shown), and outputs the odd column display image data to the display processing block 2313. In addition, the adjustment of the timing, which is performed in order to output the display image data acquired by the input control block 2312 to the display processing block 2313 from a predetermined timing, is, for example, performed by a buffer section provided in the input control block 2312.

The display processing block 2313 outputs output image data obtained by performing the display processing on the display image data input from the input control block 2312, to the output selection unit 235. In addition, when the display processing unit 231 and the display processing unit 232 perform the display processing on the display image data to be displayed on the 4K-TV 310 in cooperation with each other, the display processing block 2313 outputs the output image data obtained by performing the display processing on the odd column image data input from the input control block 2312, to the output selection unit 235.

Similarly to the synchronization signal generation block 2311 in the display processing unit 231, the synchronization signal generation block 2321 generates a synchronization signal (for example, a vertical synchronization signal V or a horizontal synchronization signal H), which represents the timing at which an image corresponding to output image data is displayed on the display device connected to the display processing unit 232, on the basis of the operation clock supplied from the clock control unit 234. Then, the synchronization signal generation block 2321 outputs the generated synchronization signal to the display device connected to the display processing unit 232.

Furthermore, similarly to the synchronization signal generation block 2311 in the display processing unit 231, on the basis of the generated synchronization signal, the synchronization signal generation block 2321 generates a trigger signal TG2, which represents the timing at which display image data of one frame to be displayed on the display device connected to the display processing unit 232 is acquired from the DRAM (not shown) and the display processing is started, that is, the start timing of the DMA, and outputs the generated trigger signal TG2 to the synchronization signal selection block 2324. The trigger signal TG2, for example, represents the timing at which the acquisition of display image data corresponding to an initial pixel (that is, an upper left pixel of an image) in display image data of one frame to be output to the EVF 32 connected to the display processing unit 232 from the DRAM (not shown) is started.

The synchronization signal selection block 2324 selects any one trigger signal of the trigger signal TG2 input from the synchronization signal generation block 2321 and the trigger signal TG1a input from the synchronization signal generation block 2311 in the display processing unit 231, and outputs the selected trigger signal TG to the input control block 2322.

In addition, when the display processing unit 232 independently causes an image to be displayed on the connected EVF 32, the synchronization signal selection block 2324 outputs the trigger signal TG2 input from the synchronization signal generation block 2321, to the input control block 2322 as the trigger signal TG Furthermore, when the display processing unit 231 and the display processing unit 232 cause the image to be displayed on the 4K-TV 310 in cooperation with each other, the synchronization signal selection block 2324 outputs the trigger signal TG1a input from the synchronization signal generation block 2311 in the display processing unit 231, to the input control block 2322 as the trigger signal TG.

Similarly to the input control block 2312 in the display processing unit 231, the input control block 2322 starts the DMA, by which the display processing unit 232 acquires display image data to be subjected to the display processing, in response to the trigger signal TG input from the synchronization signal selection block 2324. Then, the input control block 2322 outputs the display image data acquired (read) from the DRAM (not shown) by the DMA, to the display processing block 2323 from a predetermined timing.

In addition, when the display processing unit 232 independently performs the display processing on the display image data to be displayed on the EVF 32, the input control block 2322 acquires (reads) the display image data to be displayed on the EVF 32 (hereinafter referred to as "EVF display image data") from the DRAM (not shown), and outputs the EVF display image data to the display processing block 2323. Furthermore, when the display processing unit 231 and the display processing unit 232 perform the display processing on the display image data to be displayed on the 4K-TV 310 in cooperation with each other, the input control block 2322 acquires (reads) display image data including pixel data of even columns (hereinafter referred to as "even column display image data") in the display image data to be displayed on the 4K-TV 310 from the DRAM (not shown), and outputs the even column display image data to the display processing block 2323.

In addition, similarly to the input control block 2312 in the display processing unit 231, the adjustment of the timing, which is performed in order to output the display image data acquired by the input control block 2322 to the display processing block 2323 from a predetermined timing, is, for example, performed by a buffer section provided in the input control block 2322. The start timing of outputting the display image data acquired by the input control block 2312 to the display processing block 2313 is the same as the start timing of outputting the display image data acquired by the input control block 2322 to the display processing block 2323. Therefore, when the display processing unit 231 and the display processing unit 232 perform the display processing on the display image data to be displayed on the 4K-TV 310 in cooperation with each other, the start timing of the display processing by the display processing block 2313 is the same as the start timing of the display processing by the display processing block 2323. In this way, the display processing unit 231 and the display processing unit 232 can simultaneously perform the display processing on input display image data, and output output image data from the same timing. That is, the display processing unit 231 and the display processing unit 232 can output, at the same timing, the output image data obtained by performing the display processing on the odd column display image data and the output image data obtained by performing the display processing on the even column display image data.

Similarly to the display processing block 2313 in the display processing unit 231, the display processing block 2323 outputs output image data obtained by performing the display processing on the display image data input from the input control block 2322. At this time, when the display processing unit 232 independently performs the display processing on the EVF display image data to be displayed on the EVF 32, the display processing block 2323 outputs output image data obtained by performing the display processing on the EVF display image data input from the input control block 2322, to the EVF 32. Furthermore, when the display processing unit 231 and the display processing unit 232 perform the display processing on the display image data to be displayed on the 4K-TV 310 in cooperation with each other, the display processing block 2323 outputs output image data obtained by performing the display processing on the even column display image data input from the input control block 2322, to the output selection unit 235.

On the basis of the synchronization signal (for example, the vertical synchronization signal V or the horizontal synchronization signal H) input from the synchronization signal generation block 2311, the output selection unit 235 selects the output image data obtained by performing the display processing on the odd column display image data output from the display processing block 2313 in the display processing unit 231 or the output image data obtained by performing the display processing on the even column display image data output from the display processing block 2323 in the display processing unit 232. Then, the output selection unit 235 outputs the selected output image data to a connected display device.

In addition, when the display processing unit 231 and the display processing unit 232 display an image on the 4K-TV 310 in cooperation with each other, the output selection unit 235 determines a period in which the 4K-TV 310 displays the image on the basis of the synchronization signal (for example, the vertical synchronization signal V or the horizontal synchronization signal H) output from the synchronization signal generation block 2311. Then, the output selection unit 235 sequentially selects the output image data obtained by performing the display processing on the odd column display image data or the output image data obtained by performing the display processing on the even column display image data at each timing of a clock which is output by the clock control unit 234 for the period in which the image is displayed on the 4K-TV 310 and with which the 4K-TV 310 displays respective pixels of the image. Then, the output selection unit 235 sequentially outputs the selected image data to the 4K-TV 310 at each timing of the clock with which the 4K-TV 310 displays respective pixels of the image. As described above, the output selection unit 235 sequentially selects any one of the output image data obtained by performing the display processing on the odd column display image data and the output image data obtained by performing the display processing on the even column display image data, and sequentially outputs image data of respective lines of the image to be displayed on the 4K-TV 310, to the 4K-TV 310. In this way, one image which corresponds to output image data obtained by combining the output image data subjected to the display processing corresponding to the odd column display image data with the output image data subjected to the display processing corresponding to the even column display image data, that is, output image data obtained by performing the display processing on the display image data to be displayed on the 4K-TV 310, is displayed on the 4K-TV 310.

Furthermore, in the case in which the display processing unit 231 and the display processing unit 232 do not operate in cooperation with each other such as the case in which the TV 31 used to display an image by only the display processing unit 231 is connected to the display processing device 23, the output selection unit 235 does not select the output image data, and outputs the output image data subjected to the display processing by the display processing block 2313 in the display processing unit 231, to the connected TV 31. In this way, the TV 31 displays an image corresponding to the display-processed output image data output from the display processing block 2313 in the display processing unit 231.

The clock control unit 234 generates a clock with a frequency suitable when the respective elements provided in the display processing device 23 (the display processing unit 231, the display processing unit 232, and the output selection unit 235) operate, and supplies the generated clock to the respective elements.

In more detail, the clock control unit 234 generates a clock (hereinafter referred to as a "display device clock") used when the display device connected to the display processing device 23 displays an image corresponding to the display-processed output image data. In this case, the frequency of the display device clock generated by the clock control unit 234, for example, indicates a cycle (a frequency) required when the display device connected to the display processing device 23 displays an image corresponding to one pixel. The display device clock corresponds to a so-called pixel clock.

For example, when the TV 31 that displays the image of the full HD size (1920×1080) is connected to the display processing device 23, the clock control unit 234 generates a display device clock with a frequency required in order to display respective pixels of the image to be displayed on the TV 31. Furthermore, when the EVF 32 is connected to the display processing device 23, the clock control unit 234 generates a display device clock with a frequency required when the EVF 32 displays respective pixels of an image corresponding to the EVF display image data. Furthermore, when the 4K-TV 310 that displays the image of the 4K2K size (3840×2160) is connected to the display processing device 23, the clock control unit 234 generates a display device clock with a frequency required in order to display respective pixels of the image to be displayed on the 4K-TV 310, that is, a display device clock with a frequency four times that of the display device clock generated when the TV 31 is connected to the display processing device 23.

Then, on the basis of the generated display device clock, the clock control unit 234 generates an operation clock for operating the respective elements, and supplies the generated operation clock to the respective elements. The operation clock supplied to the respective elements by the clock control unit 234 has the same phase as the display device clock. For example, when the display processing unit 231 independently causes an image to be displayed on the TV 31 and the display processing unit 232 independently causes an image to be displayed on the EVF 32, the clock control unit 234 generates a display device clock corresponding to the TV 31 and a display device clock corresponding to the EVF 32. Then, the clock control unit 234 supplies an operation clock with the same phase generated on the basis of the display device clock corresponding to the TV 31 to the display processing unit 231 and supplies an operation clock with the same phase generated on the basis of the display device clock corresponding to the EVF 32 to the display processing unit 232. In addition, the respective display device clocks may also be employed as the respective operation clocks.

In addition, when the 4K-TV 310 is connected to the display processing device 23, the clock control unit 234 generates the display device clock with the frequency four times that of the display device clock corresponding to the TV 31 as described above. However, in the display processing device 23, the display processing unit 231 and the display processing unit 232 perform the display processing on the display image data to be displayed on the 4K-TV 310 in cooperation with each other. That is, as described above, in the display processing device 23, each of the display processing unit 231 and the display processing unit 232 performs the display processing on any one of the display image data obtained by dividing the display image data to be displayed on the 4K-TV 310 in two in each column. That is, the amount of the display image data to be subjected to the display processing by each of the display processing unit 231 and the display processing unit 232 is ½. Therefore, each of the display processing unit 231 and the display processing unit 232 can complete an operation at the same cycle even in the case of an operation clock with a frequency corresponding to ½ of the frequency of the display device clock with the frequency four times that of the display device clock corresponding to the TV 31, that is, an operation clock with a frequency two times that of the display device clock corresponding to the TV 31. Consequently, the clock control unit 234 supplies the operation clock with the frequency two times that of the display device clock corresponding to the TV 31, to each of the display processing unit 231 and the display processing unit 232.

With such a configuration, in the display processing device 23 according to the present embodiment, even when a display device that displays an image with higher definition than an image with a size handled by the display processing unit 230 provided in the display processing device 23 is connected, a plurality of display processing units 230 operate in cooperation with one another in a parallel manner, thereby handling the display device that displays a high definition image in the state in which the frequency of the operation clock of each display processing unit 230 is suppressed. Furthermore, in the display processing device 23 according to the present embodiment, the frequency of the operation clock of each display processing unit 230 is suppressed, so that it is also possible to limit an increase in the power consumption of the display processing device 23 itself according to the present embodiment.

Next, an operation in which the display processing device 23 according to the present embodiment divides and processes an image in each column will be described. The following description will be provided for an example of an operation in which the display processing device 23 divides display image data in two in each column, and the two display processing units 230 perform the display processing on the divided display image data in cooperation with each other in a parallel manner.

Figure 3:
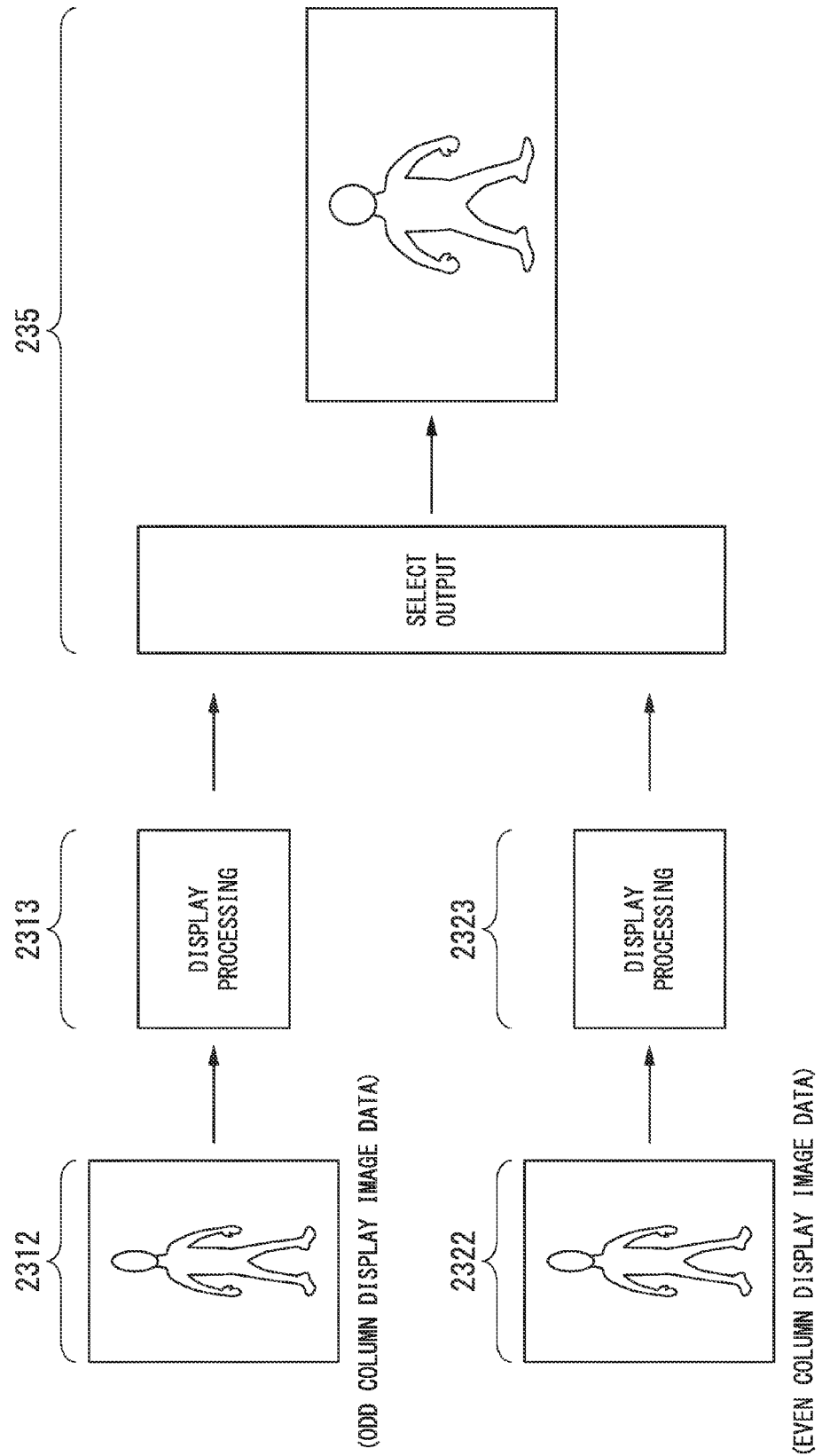
FIG. 3 is a diagram schematically showing an example of the case of dividing and processing an image in the display processing device according to the present embodiment.

First, the entire flow of the operation in which the display processing device 23 according to the present embodiment divides and processes an image will be described. FIG. 3 is a diagram schematically showing an example of the case of dividing and processing an image in the display processing device 23 according to the present embodiment.

As described above, when the display processing device 23 divides the display image data in two in each column and performs the display processing, the display processing unit 231 and the display processing unit 232 cooperate with each other in such a manner that the display processing unit 231 performs the display processing on the odd column display image data including the pixel data of odd columns and the display processing unit 232 performs the display processing on the even column display image data including the pixel data of even columns. An upper part of FIG. 3 shows the processing on the odd column display image data and a lower part of FIG. 3 shows the processing on the even column display image data.

As shown in the upper part of FIG. 3, in the display processing unit 231, the input control block 2312 acquires (reads) the odd column display image data from the DRAM (not shown) by the DMA, and outputs the odd column display image data to the display processing block 2313. Then, the display processing block 2313 performs the display processing on the odd column display image data input from the input control block 2312, and outputs display-processed output image data to the output selection unit 235.

Furthermore, as shown in the lower part of FIG. 3, in the display processing unit 232, the input control block 2322 acquires (reads) the even column display image data from the DRAM (not shown) by the DMA, and outputs the even column display image data to the display processing block 2323. Then, the display processing block 2323 performs the display processing on the even column display image data input from the input control block 2322, and outputs display-processed output image data to the output selection unit 235.

Then, the output selection unit 235 sequentially selects output image data corresponding to the odd column display image data output from the display processing unit 231 and output image data corresponding to the even column display image data output from the display processing unit 232, at the timing of the display device clock, and sequentially outputs the selected output image data to the display device connected to the display processing device 23.

As described above, in the display processing device 23, the two display processing units 230 perform the display processing in cooperation with each other in a parallel manner, so that it is possible to perform the display processing on an image with a size on which each display processing unit 230 is not able to independently perform the display processing. At this time, in the display processing device 23, each of the two display processing units 230 operating in cooperation with each other performs the display processing on display image data of any one of the display image data obtained by dividing the display image data in two in each column, so that it is possible to perform the display processing in the state in which the frequency of the operation clock of each display processing unit 230 is suppressed.

Next, a description will be provided for operations of respective elements corresponding to the number of image signal input systems provided in the display device connected to the display processing device 23 when the display processing device 23 according to the present embodiment divides and processes an image in each column. In addition, the following description will be provided for an operation when the 4K-TV 310 that displays the image of the 4K2K size (3840×2160) is connected to the display processing device 23 including the two display processing units 231 and 232 corresponding to the TV 31 that displays the image of the full HD size (1920×1080) as shown in FIG. 2, and the display processing unit 231 and the display processing unit 232 output the display-processed output image data to the 4K-TV 310 in cooperation with each other.

<First Operation>

Figure 4:
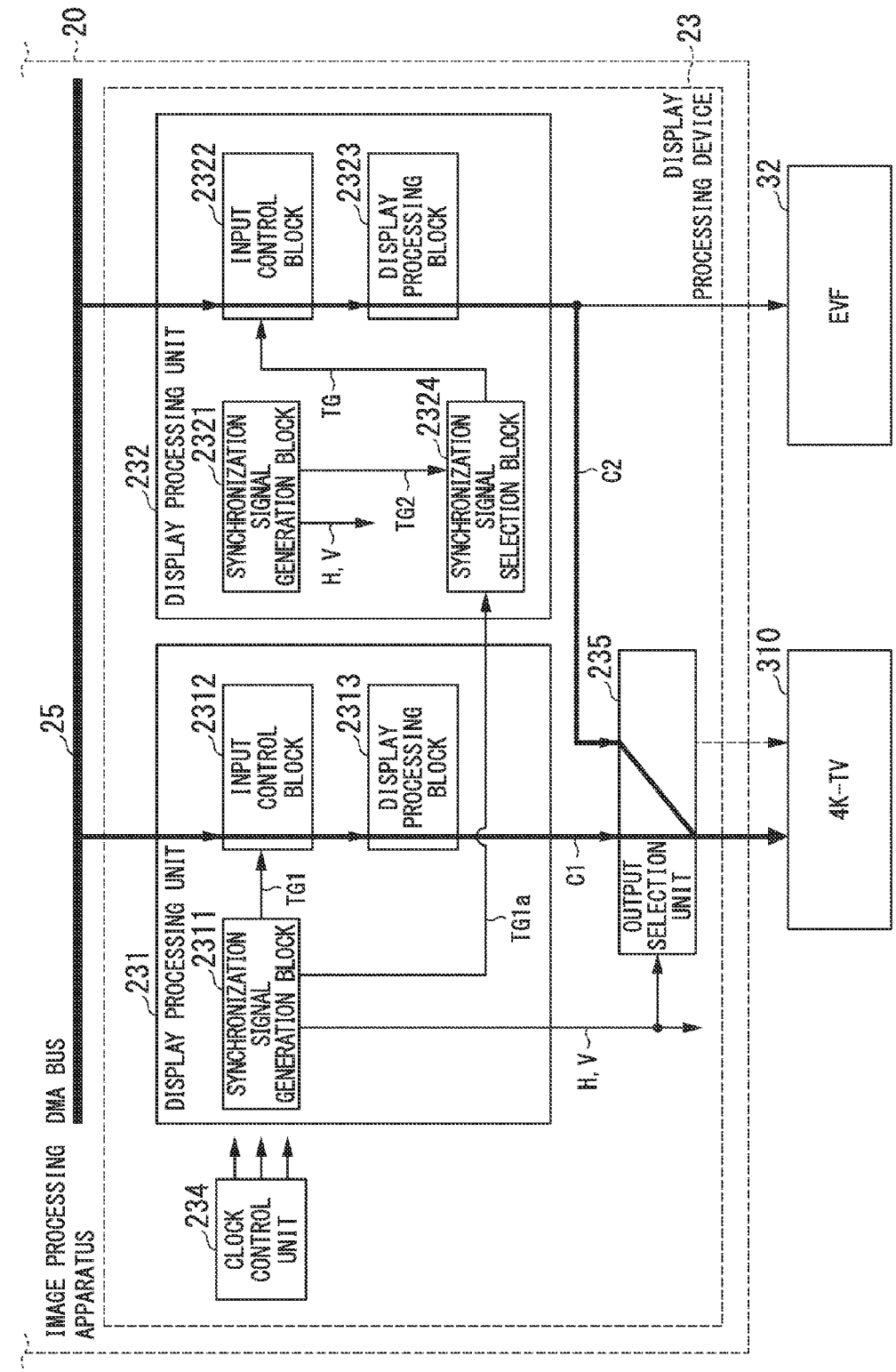
FIG. 4 is a diagram showing an example of a first operation of processing an image in the display processing device according to the present embodiment.

FIG. 4 is a diagram showing an example of the first operation in which the display processing device 23 according to the present embodiment processes an image. The example of the operation shown in FIG. 4 indicates an operation when the display-processed output image data of the 4K2K size (3840×2160), on which the display processing unit 231 and the display processing unit 232 have performed the display processing in cooperation with each other, is output to the 4K-TV 310 including one image signal input system. FIG. 4 shows respective image data paths in the first operation on the block diagram of the display processing device 23.

In the first operation, the clock control unit 234 generates a display device clock used to display an image on the 4K-TV 310 connected to the display processing device 23. In this case, the frequency of the display device clock generated by the clock control unit 234 is four times the frequency of the display device clock generated when the TV 31 is connected to the display processing device 23. Then, the clock control unit 234 supplies the generated display device clock to the output selection unit 235.

Furthermore, on the basis of the generated display device clock, the clock control unit 234 generates an operation clock with a frequency corresponding to ½ of the frequency of the display device clock. Then, the clock control unit 234 supplies the generated operation clock to the display processing unit 231 and the display processing unit 232.

Then, the synchronization signal generation block 2311 in the display processing unit 231 generates a vertical synchronization signal V and a horizontal synchronization signal H used to display an image corresponding to display-processed output image data on the 4K-TV 310, on the basis of the operation clock supplied from the clock control unit 234. Then, the synchronization signal generation block 2311 outputs the generated vertical synchronization signal V and horizontal synchronization signal H to the output selection unit 235 and the 4K-TV 310.

Thereafter, the synchronization signal generation block 2311 outputs the trigger signal TG1 to the input control block 2312 at the timing at which the vertical synchronization signal V represents the display timing of an image of one frame on the 4K-TV 310 and then the horizontal synchronization signal H represents the start of a horizontal period in which output image data is output, that is, at the timing representing the start of the first line of an image of one frame to be displayed on the 4K-TV 310. In this way, in response to the trigger signal TG1 input from the synchronization signal generation block 2311, the input control block 2312 starts DMA for acquiring the pixel data of the odd column display image data from the first line of display image data of one frame, on which the display processing unit 231 performs the display processing (refer to the image data path C1 in FIG. 4).

Furthermore, the synchronization signal generation block 2311 outputs the trigger signal TG1a having the same timing as the trigger signal TG1 to the synchronization signal selection block 2324 in the display processing unit 232. Then, the synchronization signal selection block 2324 outputs the trigger signal TG1a input from the synchronization signal generation block 2311 in the display processing unit 231 to the input control block 2322 as the trigger signal TG. In this way, in response to the trigger signal TG input from the synchronization signal selection block 2324, the input control block 2322 starts DMA for acquiring the pixel data of the even column display image data from the first line of the display image data of one frame, on which the display processing unit 232 performs the display processing (refer to the image data path C2 in FIG. 4).

As described above, the input control block 2312 in the display processing unit 231 and the input control block 2322 in the display processing unit 232 acquire display image data of corresponding columns from the DRAM (not shown) by the DMA in synchronization with each other.

Then, the input control block 2312 outputs the pixel data of the odd column display image data acquired from the DRAM (not shown) by the DMA, to the display processing block 2313 (refer to the image data path C1 in FIG. 4). In this way, the display processing block 2313 outputs output image data obtained by performing the display processing on the pixel data of the odd column display image data input from the input control block 2312, to the output selection unit 235 (refer to the image data path C1 in FIG. 4). Furthermore, the input control block 2322 outputs the pixel data of the even column display image data acquired from the DRAM (not shown) by the DMA, to the display processing block 2323 (refer to the image data path C2 in FIG. 4). In this way, the display processing block 2323 outputs output image data obtained by performing the display processing on the pixel data of the even column display image data input from the input control block 2322, to the output selection unit 235 (refer to the image data path C2 in FIG. 4).

Then, the output selection unit 235 starts the output of the display-processed output image data from the timing at which the vertical synchronization signal V input from the synchronization signal generation block 2311 in the display processing unit 231 represents the display timing of the image of one frame on the 4K-TV 310, and the horizontal synchronization signal H represents the start of the horizontal period in which the output image data is output, that is, represents the timing of the first line of the image of one frame to be displayed on the 4K-TV 310, and then image data of an initial pixel is output. At this time, the output selection unit 235 sequentially outputs the output image data to the 4K-TV 310 at the timing of the display device clock input from the synchronization signal generation block 2311 in the display processing unit 231, that is, at the timing at which the 4K-TV 310 displays the image.

In the output of the output image data in the output selection unit 235, at the timing of the initial pixel in the first line of one frame to be output to the 4K-TV 310, the output image data for the odd column display image data input from the input control block 2312 is selected and is output to the 4K-TV 310 at the timing of the display device clock (refer to the image data path C1 in FIG. 4). Then, at the timing of the next (second) pixel in the first line of one frame to be output to the 4K-TV 310, the output image data for the even column display image data input from the input control block 2322 is selected and is output to the 4K-TV 310 at the timing of the display device clock (refer to the image data path C2 in FIG. 4). Moreover, at the timing of the next (third) pixel in the first line of one frame to be output to the 4K-TV 310, the output image data for the odd column display image data secondly input from the input control block 2312 is selected and is output to the 4K-TV 310 at the timing of the display device clock (refer to the image data path C1 in FIG. 4). As described above, in the output of the output image data by the output selection unit 235, the output image data for the odd column display image data input from the input control block 2312 and the output image data for the even column display image data input from the input control block 2322 are alternately selected at the timing of the display device clock, and the selected image data is output to the 4K-TV 310 at the timing of the display device clock.

In this way, an image corresponding to the output image data of the first line of one frame output from the output selection unit 235 is displayed on the 4K-TV 310.

Furthermore, after the acquisition of the odd column display image data of the first line of the display image data of one frame by the DMA ends, the input control block 2312 subsequently starts the DMA for acquiring the odd column display image data of the second line of the display image data of one frame (refer to the image data path C1 in FIG. 4). Then, the input control block 2312 outputs the pixel data of the odd column display image data acquired from the DRAM (not shown) by the DMA, to the display processing block 2313 (refer to the image data path C1 in FIG. 4). Furthermore, after the acquisition of the even column display image data of the first line of the display image data of one frame by the DMA ends, the input control block 2322 subsequently starts the DMA for acquiring the even column display image data of the second line of the display image data of one frame (refer to the image data path C2 in FIG. 4). Then, the input control block 2322 outputs the pixel data of the even column display image data acquired from the DRAM (not shown) by the DMA, to the display processing block 2323 (refer to the image data path C2 in FIG. 4).

As described above, each of the input control block 2312 and the input control block 2322 sequentially acquires display image data of a corresponding column from the DRAM (not shown) by the DMA in each line, and sequentially outputs the acquired display image data to the corresponding display processing block 2313 or display processing block 2323 in each line. In this way, each of the display processing block 2313 and the display processing block 2323 performs the display processing on the display image data of the corresponding column input from the corresponding input control block 2312 or input control block 2322, and sequentially outputs the display-processed output image data to the output selection unit 235 in each line of the display image data.

Then, the output selection unit 235 starts the output of the display-processed output image data from the timing at which the horizontal synchronization signal H input from the synchronization signal generation block 2311 in the display processing unit 231 represents the start of a next horizontal period in which the output image data is output, that is, the timing of the second line of the image of one frame to be displayed on the 4K-TV 310, and then image data of an initial pixel of the second line is output. At this time, the output selection unit 235 alternately selects the output image data for the odd column display image data input from the input control block 2312 and the output image data for the even column display image data input from the input control block 2322, and sequentially outputs the selected image data to the 4K-TV 310 at the timing at which the 4K-TV 310 displays an image, that is, at the timing of the display device clock.

In this way, output image data of the first line and subsequent lines of one frame is sequentially output from the output selection unit 235 to the 4K-TV 310, so that an image corresponding to the output image data of the first line and subsequent lines of one frame output from the output selection unit 235 is displayed on the 4K-TV 310.

As described above, in the first operation, the two display processing units 231 and 232 provided in the display processing device 23 and handling the display image data of the full HD size (1920×1080) perform the display processing for the odd column display image data and the display processing for the even column display image data in cooperation with each other in a parallel manner, thereby performing the display processing for the display image data of the 4K2K size (3840×2160). Then, the output selection unit 235 provided in the display processing device 23 outputs the display-processed output image data of the 4K2K size (3840×2160) to the 4K-TV 310 connected to the display processing device 23, at the timing of the display device clock used to display the image of the 4K2K size (3840×2160). As described above, in the first operation, the display processing unit 231 and the display processing unit 232 perform the display processing on display image data in realtime in synchronization with each other, and output the display-processed output image data of the 4K2K size (3840×2160) to the 4K-TV 310 connected to the display processing device 23.

At this time, each of the display processing unit 231 and the display processing unit 232 operates with an operation clock of a frequency corresponding to ½ of that of the display device clock used to display the image of the 4K2K size (3840×2160). Furthermore, the output selection unit 235 operates with the display device clock used to display the image of the 4K2K size (3840×2160). In this way, in the display processing device 23, the frequency of the display device clock for outputting the output image data to the 4K-TV 310 is four times the frequency of the display device clock of the TV 31 that displays the image of the full HD size (1920×1080), in response to the frequency of a clock required when the connected 4K-TV 310 displays an image corresponding to one pixel; however, the display processing on the display image data of the 4K2K size (3840×2160) can be performed using a frequency corresponding to ½ of the frequency of the display device clock of the 4K-TV 310. That is, the display processing unit 231 and the display processing unit 232 provided in the display processing device 23 can operate with the frequency corresponding to ½ of the frequency of the display device clock. In this way, in the display processing device 23, by the first operation, in a state in which the frequency of the operation clock is suppressed, it is possible to perform display processing on an image with higher definition than the image with a size handled by each of the display processing unit 231 and the display processing unit 232 provided in the display processing device 23.

<Second Operation>

Figure 5:
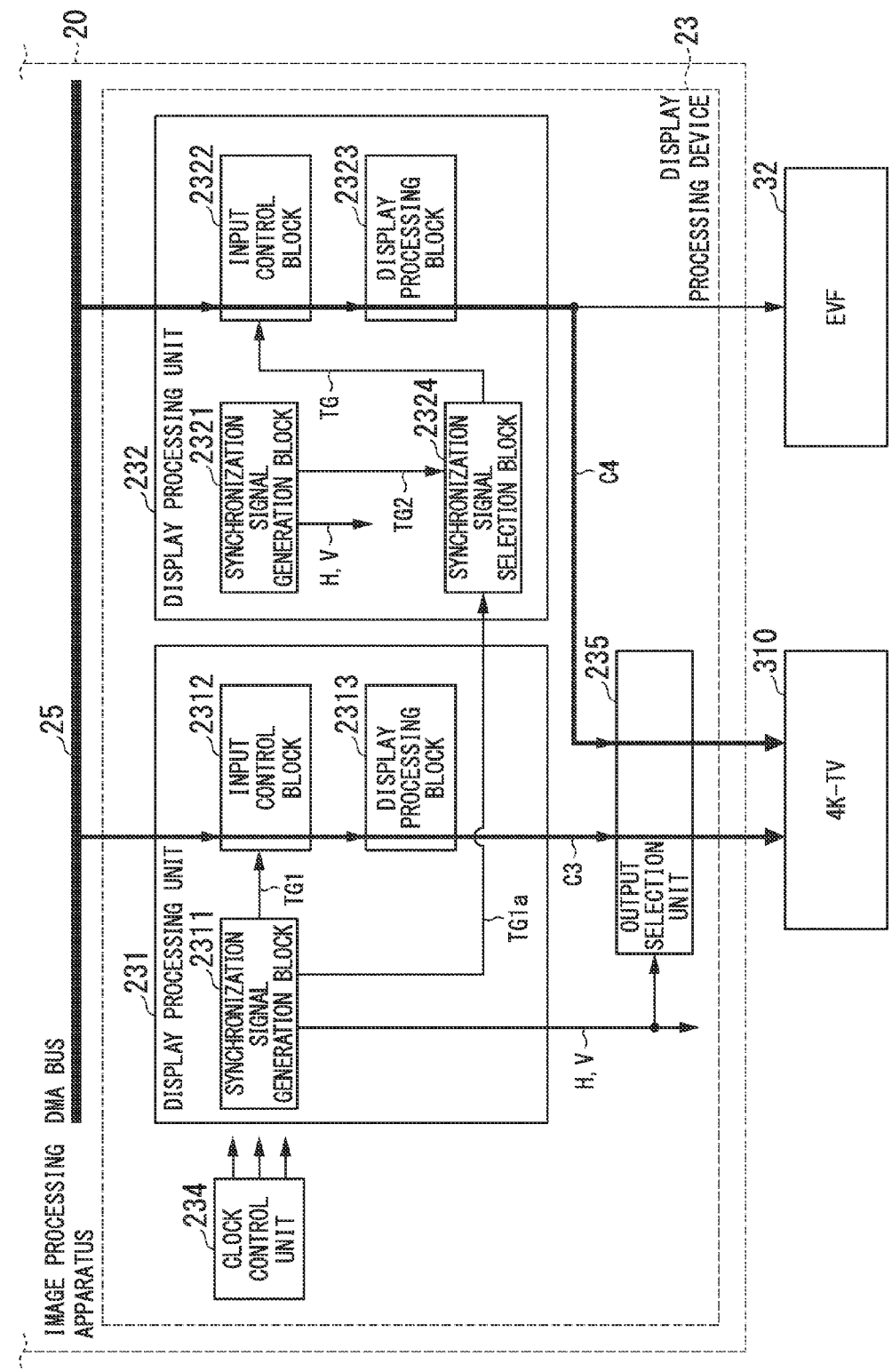
FIG. 5 is a diagram showing an example of a second operation of processing an image in the display processing device according to the present embodiment.

FIG. 5 is a diagram showing an example of the second operation in which the display processing device 23 according to the present embodiment processes an image. The example of the operation shown in FIG. 5 indicates an operation in which the display-processed output image data of the 4K2K size (3840×2160), on which the display processing unit 231 and the display processing unit 232 have performed the display processing in cooperation with each other, is output to the 4K-TV 310 including two image signal input systems. FIG. 5 shows respective image data paths in the second operation on the block diagram of the display processing device 23.

In the second operation, similarly to the first operation, the clock control unit 234 generates the display device clock used to display an image on the 4K-TV 310 connected to the display processing device 23, that is, the clock with the frequency four times the frequency of the display device clock generated when the TV 31 is connected to the display processing device 23.

Furthermore, similarly to the first operation, on the basis of the generated display device clock, the clock control unit 234 generates the operation clock with the frequency corresponding to ½ of the frequency of the display device clock, and supplies the generated operation clock to the display processing unit 231 and the display processing unit 232. In the second operation, the clock control unit 234 also supplies the generated operation clock to the output selection unit 235.

Then, similarly to the first operation, the synchronization signal generation block 2311 in the display processing unit 231 generates the vertical synchronization signal V and the horizontal synchronization signal H used to display the display-processed output image data on the 4K-TV 310, on the basis of the operation clock supplied from the clock control unit 234, and outputs the generated vertical synchronization signal V and horizontal synchronization signal H to the output selection unit 235 and the 4K-TV 310.

Thereafter, the synchronization signal generation block 2311 outputs the trigger signal TG1 to the input control block 2312 at the same timing as that in the first operation. In this way, similarly to the first operation, in response to the trigger signal TG1 input from the synchronization signal generation block 2311, the input control block 2312 starts the DMA for acquiring the pixel data of the odd column display image data from the first line of the display image data of one frame, on which the display processing unit 231 performs the display processing (refer to the image data path C3 in FIG. 5).

Furthermore, similarly to the first operation, the synchronization signal generation block 2311 outputs the trigger signal TG1*a* having the same timing as the trigger signal TG1 to the synchronization signal selection block 2324 in the display processing unit 232. The synchronization signal selection block 2324 outputs the trigger signal TG1*a* input from the synchronization signal generation block 2311 in the display processing unit 231, to the input control block 2322 as the trigger signal TG. In this way, similarly to the first operation, in response to the trigger signal TG input from the synchronization signal selection block 2324, the input control block 2322 starts the DMA for acquiring the pixel data of the even column display image data from the first line of the display image data of one frame, on which the display processing unit 232 performs the display processing (refer to the image data path C4 in FIG. 5).

As described above, in the second operation, similarly to the first operation, the input control block 2312 in the display processing unit 231 and the input control block 2322 in the display processing unit 232 acquire the display image data of corresponding columns from the DRAM (not shown) by the DMA in synchronization with each other.

Then, similarly to the first operation, the input control block 2312 outputs the pixel data of the odd column display image data acquired from the DRAM (not shown) by the DMA, to the display processing block 2313. The display processing block 2313 outputs the output image data obtained by performing the display processing on the pixel data of the odd column display image data input from the input control block 2312, to the output selection unit 235 (refer to the image data path C3 in FIG. 5). Furthermore, similarly to the first operation, the input control block 2322 outputs the pixel data of the even column display image data acquired from the DRAM (not shown) by the DMA, to the display processing block 2323. The display processing block 2323 outputs the output image data obtained by performing the display processing on the pixel data of the even column display image data input from the input control block 2322, to the output selection unit 235 (refer to the image data path C4 in FIG. 5).

Then, the output selection unit 235 starts the output of the display-processed output image data from the same timing as that in the first operation. At this time, the output selection unit 235 simultaneously outputs the display-processed output image data for the odd column display image data and the display-processed output image data for the even column display image data to the 4K-TV 310 in a sequential manner at the timing of the operation clock input from the synchronization signal generation block 2311 in the display processing unit 231, that is, at the timing of a frequency corresponding to ½ of the frequency of the display device clock with which the 4K-TV 310 displays an image.

In the output of the output image data in the output selection unit 235, the output image data for the odd column display image data input from the input control block 2312 is sequentially output to the 4K-TV 310 at the timing of the operation clock from the timing of the initial pixel in the first line of one frame to be output to the 4K-TV 310 (refer to the image data path C3 in FIG. 5). Furthermore, the output selection unit 235 sequentially outputs the output image data for the even column display image data input from the input control block 2322, to the 4K-TV 310 at the timing of the operation clock from the timing of the initial pixel in the first line of one frame to be output to the 4K-TV 310, that is, the same timing as that at which the output image data for the odd column display image data is output to the 4K-TV 310 (refer to the image data path C4 in FIG. 5).

In this way, the output image data corresponding to odd columns in the first line of the image of one frame to be displayed on the 4K-TV 310 and the output image data corresponding to even columns in the first line of the image of one frame to be displayed on the 4K-TV 310 are simultaneously output from the output selection unit 235 to one of the image signal input systems provided in the 4K-TV 310 (refer to the image data path C3 in FIG. 5) and to the other of the image signal input systems provided in the 4K-TV 310 (refer to the image data path C4 in FIG. 5), respectively. Then, an image corresponding to the output image data of the first line of one frame output to each input system from the output selection unit 235 is displayed on the 4K-TV 310.

Furthermore, similarly to the first operation, after the acquisition of the odd column display image data of the first line of the display image data of one frame by the DMA ends, the input control block 2312 subsequently starts the DMA for acquiring the odd column display image data of the second line of the display image data of one frame, and outputs the pixel data of the odd column display image data acquired from the DRAM (not shown) by the DMA, to the display processing block 2313 (refer to the image data path C3 in FIG. 5). Furthermore, similarly to the first operation, after the acquisition of the even column display image data of the first line of the display image data of one frame by the DMA ends, the input control block 2322 subsequently starts the DMA for acquiring the even column display image data of the second line of the display image data of one frame, and outputs each pixel data of the even column display image data acquired from the DRAM (not shown) by the DMA, to the display processing block 2323 (refer to the image data path C4 in FIG. 5).

As described above, in the second operation, similarly to the first operation, each of the input control block 2312 and the input control block 2322 sequentially acquires display image data of the corresponding column from the DRAM (not shown) by the DMA in each line, and sequentially outputs the acquired display image data to the corresponding display processing block 2313 or display processing block 2323 in each line. In this way, similarly to the first operation, each of the display processing block 2313 and the display processing block 2323 performs the display processing on the display image data of the corresponding column input from the corresponding input control block 2312 or input control block 2322, and sequentially outputs the display-processed output image data to the output selection unit 235 in each line of the display image data.

Then, from the same timing as that in the first operation, the output selection unit 235 simultaneously outputs the display-processed output image data for the odd column display image data input from the input control block 2312 and the display-processed output image data for the even column display image data input from the input control block 2322, to the 4K-TV 310 in a sequential manner at the timing of the frequency corresponding to ½ of the frequency of the display device clock with which the 4K-TV 310 displays an image, that is, the timing of the operation clock.

In this way, output image data corresponding to odd columns in the first line and subsequent lines of the image of one frame to be displayed on the 4K-TV 310 and output image data corresponding to even columns are simultaneously output to respective input systems provided in the 4K-TV 310 and corresponding to an image signal from the output selection unit 235 in a sequential manner. Then, an image corresponding to the output image data of the first line and subsequent lines of one frame output from the output selection unit 235 to the respective input systems is displayed on the 4K-TV 310.

As described above, in the second operation, similarly to the first operation, the two display processing units 231 and 232 provided in the display processing device 23 and handling the display image data of the full HD size (1920×1080) perform the display processing for the odd column display image data and the display processing for the even column display image data in cooperation with each other in a parallel manner, thereby performing the display processing for the display image data of the 4K2K size (3840×2160). Then, in the second operation, the output selection unit 235 provided in the display processing device 23 simultaneously outputs the display-processed output image data corresponding to the odd columns and the display-processed output image data corresponding to the even columns to the respective input systems provided in the 4K-TV 310 connected to the display processing device 23 and corresponding to the image signal at the timing of the frequency corresponding to ½ of that of the display device clock with which the image of the 4K2K size (3840×2160) is displayed. As described above, in the second operation, similarly to the first operation, the display processing unit 231 and the display processing unit 232 perform the display processing on display image data in realtime in synchronization with each other, and output the display-processed output image data of the 4K2K size (3840×2160) to the respective input systems of the 4K-TV 310 connected to the display processing device 23.

At this time, each of the display processing unit 231 and the display processing unit 232 operates with the operation clock of the frequency corresponding to ½ of that of the display device clock used to display the image of the 4K2K size (3840×2160). Furthermore, the output selection unit 235 also operates with the operation clock of the frequency corresponding to ½ of that of the display device clock used to display the image of the 4K2K size (3840×2160). That is, in the second operation in the display processing device 23, respective elements can operate with the operation clock of the frequency corresponding to ½ of that of the display device clock required when the 4K-TV 310 connected to the display processing device 23 displays an image corresponding to one pixel. In other words, in the second operation in the display processing device 23, the frequency of the operation clock of the respective elements is only caused to be twice that of the display device clock of the TV 31 that displays the image of the full HD size (1920×1080), so that it is possible to perform the display processing on the display image data of the 4K2K size (3840×2160) and the output of the display-processed output image data. In this way, in the display processing device 23, by the second operation, in the state in which the frequency of the operation clock is suppressed, it is possible to perform the display processing on an image with higher definition than an image of a size handled by each of the display processing unit 231 and the display processing unit 232 provided in the display processing device 23.

In addition, in the second operation, the case in which the operation clock of the output selection unit 235 is an operation clock with the frequency corresponding to ½ of that of the display device clock used to display the image on the 4K-TV 310 has been described. However, in the second operation, similarly to the first operation, the operation clock of the output selection unit 235 may be set as the display device clock used to display the image on the 4K-TV 310.

According to the present embodiment, a display processing device (the display processing device 23) performs predetermined display processing on image data (display image data) of a display image of a predetermined first size (for example, the full HD size (1920×1080)) input to the display processing device 23, and includes: a first display processing unit (the display processing unit 231) that outputs image data (output image data obtained by performing the display processing on odd column display image data) of a first output image obtained by performing the display processing on display image data (the odd column display image data) of an odd column of a display image of a second size (for example, the 4K2K size (3840×2160)) larger than, for example, the full HD size (1920×1080), when the display image of the second size is input to the display processing unit 231; a second display processing unit (the display processing unit 232) that outputs image data (output image data obtained by performing the display processing on even column display image data) of a second output image obtained by performing the display processing on display image data (the even column display image data) of an even column of the display image of, for example, the 4K2K size (3840×2160); an output selection unit (the output selection unit 235) that selects the output image data obtained by performing the display processing on the odd column display image data or the output image data obtained by performing the display processing on the even column display image data, and outputs the selected image data to a first display device (for example, the 4K-TV 310) that displays the display image of, for example, the 4K2K size (3840×2160); and a clock control unit (the clock control unit 234) that generates and supplies an operation clock required when the display processing unit 231 and the display processing unit 232 operate.

Furthermore, according to the present embodiment, in the display processing device 23, the display processing unit 231 acquires the odd column display image data by the DMA and notifies the display processing unit 232 of a timing at which the even column display image data is acquired by the DMA.

Furthermore, according to the present embodiment, in the display processing device 23, the display processing unit 231 includes: a first synchronization signal generation block (the synchronization signal generation block 2311) that generates and outputs a synchronization signal (for example, a vertical synchronization signal V or a horizontal synchronization signal H) required when, for example, the 4K-TV 310 displays an image corresponding to output image data output from the output selection unit 235, and generates and outputs a first trigger signal (the trigger signal TG1) representing a first timing at which acquisition of the odd column display image data by the DMA is started and a second trigger signal (the trigger signal TG1$a$) representing a second timing at which acquisition of the even column display image data by the DMA is started, on the basis of the operation clock supplied from the clock control unit 234; a first input control block (the input control block 2312) that acquires the odd column display image data by the DMA in response to the trigger signal TG1; and a first display processing block (the display processing block 2313) that outputs the image data (the output image data obtained by performing the display processing on the odd column display image data) of the first output image obtained by performing the display processing on the odd column display image data acquired by the input control block 2312. The display processing unit 232 includes: a second synchronization signal generation block (the synchronization signal generation block 2321) that generates a synchronization signal required when a second display device (for example, the TV 31, the EVF 32, the TFT-LCD 33, and the like), which is handled by the display processing unit 232 independently, displays an image corresponding to output image data output from the display processing unit 232, and generates and outputs a third trigger signal (the trigger signal TG2) representing a third timing at which acquisition of the image data (display image data) of the display image of, for example, the full HD size (1920×1080), which is handled by the display processing unit 232 independently, by the DMA is started, on the basis of the operation clock supplied from the clock control unit 234; a synchronization signal selection block (the synchronization signal selection block 2324) that selects any one of the trigger signal TG1$a$ and the trigger signal TG2 and outputs the selected trigger signal as a fourth trigger signal (the trigger signal TG); a second input control block (the input control block 2322) that acquires the even column display image data or the image data (the display image data) of the display image of, for example, the full HD size (1920×1080), which is handled by the display processing unit 232 independently, by the DMA in response to the trigger signal TG; and a second display processing block (the display processing block 2323) that outputs the even column display image data acquired by the input control block 2322, or the image data (output image data) of the second output image obtained by performing the display processing on the image data (the display image data) of the display image of, for example, the full HD size (1920×1080), which is handled by the display processing unit 232 independently.

Furthermore, according to the present embodiment, in the display processing device 23, the clock control unit 234 generates a display device clock (a so-called pixel clock) of a frequency required when, for example, the 4K-TV 310 displays an image corresponding to one pixel, and generates the operation clock with the same phase as the generated display device clock.

Furthermore, according to the present embodiment, in the display processing device 23, on the basis of the synchronization signal output by the display processing unit 231 and corresponding to, for example, the 4K-TV 310, the output selection unit 235 determines a period in which the 4K-TV 310 displays an image, alternately selects the output image data obtained by performing the display processing on the odd column display image data and the output image data obtained by performing the display processing on the even column display image data at each timing of the display device clock for the determined period in which the 4K-TV 310 displays the image, and outputs the selected image data to the 4K-TV 310 at a timing of the display device clock.

Furthermore, according to the present embodiment, in the display processing device 23, on the basis of the synchronization signal output by the display processing unit 231 and corresponding to, for example, the 4K-TV 310, the output selection unit 235 determines a period in which the 4K-TV 310 displays an image, simultaneously selects the output image data obtained by performing the display processing on the odd column display image data and the output image data obtained by performing the display processing on the even column display image data at a timing of the operation clock for the determined period in which the 4K-TV 310 displays the image, and outputs the selected image data to respective corresponding input systems provided in the 4K-TV 310 at the timing of the operation clock.

Furthermore, according to the present embodiment, an imaging apparatus (the imaging apparatus 1 or the system of the imaging apparatus 1) includes the display processing device (the display processing device 23).

As described above, according to the embodiment of the present invention, when a display device that displays an image with higher definition than an image of a size handled by a display processing unit provided in the display processing device is connected, a plurality of display processing units provided in the display processing device operate in cooperation with each other in a parallel manner. In this way, in the embodiment of the present invention, it is possible to perform the display processing on a high definition image on which each display processing unit provided in the display processing device is not able to independently perform the display processing. Furthermore, in the embodiment of the present invention, it is possible to output the display-processed output image data without depending on the image signal input system provided in the connected display device.

Furthermore, in the embodiment of the present invention, the frequency of an operation clock of each display processing unit provided in the display processing device can be reduced as compared with the frequency of a clock (in the embodiment, a display device clock, or a so-called pixel clock) used when a connected display device that displays a high definition image displays an image. In this way, in the embodiment of the present invention, even when the display device that displays a high definition image is connected, it is possible to limit an increase in the power consumption of the display processing device.

Furthermore, in the present embodiment, two display processing units 230 (the display processing unit 231 and the display processing unit 232) provided in the display processing device 23 operate in cooperation with each other in a parallel manner. At this time, each display processing unit 230 acquires display image data, which has been obtained by dividing display image data to be displayed on the 4K-TV 310 that displays an image of the 4K2K (3840×2160) size in two in each column, from the DRAM (not shown) by the DMA. Therefore, when considering burst transmission in the DMA, in the display image data of one frame to be displayed on the 4K-TV 310, it is preferable that each of display image data of pixels of an odd column and display image data of pixels of an even column be consecutive. Therefore, when generating display image data, the image processing unit 22 in the image processing apparatus 20 provided in the imaging apparatus 1 preferably generates display image data having a form in which respective pieces of the odd column display image data are integrated and respective pieces of the even column display image data are integrated, that is, display image data including display image data of one frame as two pieces of display image data. In addition, in a method for generating such a type of display image data, when the display image data generated by the image processing unit 22 is transmitted to (written in) the DRAM (not shown), respective display image data may be transmitted such that addresses of the DRAM for storing respective display image data included in the odd column display image data are consecutive and addresses of the DRAM for storing respective display image data included in the even column display image data are consecutive.

Furthermore, in the present embodiment, the case in which two display processing units 230 (the display processing unit 231 and the display processing unit 232) provided in the display processing device 23 operate in cooperation with each other in a parallel manner has been described. Therefore, in the present embodiment, the case in which display image data to be displayed on the 4K-TV 310 that displays an image of the 4K2K (3840×2160) size is divided in two in each column, the display processing unit 231 performs the display processing on the display image data including the pixel data of odd columns, and the display processing unit 232 performs the display processing on the display image data including the pixel data of even columns has been described. Accordingly, in the present embodiment, it has been described that the operation clock of each of the display processing unit 231 and the display processing unit 232 provided in the display processing device 23 is the clock of the frequency corresponding to ½ of the frequency of the display device clock used to display the image on the 4K-TV 310. However, the number of display processing units 230 operating in cooperation with each other in a parallel manner is not limited to the embodiment of the present invention, and many more display processing units 230 can be configured to operate in cooperation with each other in a parallel manner.

For example, four display processing units 230 provided in the display processing device can also be configured to operate in cooperation with each other in a parallel manner. In such a configuration, when the image of the 4K2K size (3840×2160) is displayed on the 4K-TV 310, the display image data of the 4K2K size (3840×2160) is divided into four in each column, and each of the four display processing units 230 operating in cooperation with each other in a parallel manner can perform the display processing on the divided display image data. In more detail, each column of the display image data of the 4K2K size (3840×2160) is classified into first to fourth columns and the display image data is divided into four, that is, into display image data including pixel data of the first column, display image data including pixel data of the second column, display image data including pixel data of the third column, and display image data including pixel data of the fourth column. Then, the display processing units corresponding to the respective columns divided into four columns perform the display processing on display image data including pixel data of corresponding columns in cooperation with each other in a parallel manner. In this case, the frequency of the operation clock of each of the display processing units 230 provided in the display processing device 23 can be set to ¼ of the frequency of the display device clock used to display an image on the 4K-TV 310. That is, in the embodiment of the present invention, the number of divisions in each column of the display image data to be subjected to the display processing is increased in response to the number of display processing units operating in cooperation with each other in a parallel manner, so that it is possible to suppress the frequency of the operation clock of the elements provided in the display processing device, that is, to a frequency of (1/the number of display processing units).

In this case, among the four display processing units 230, one display processing unit 230 is configured to output the trigger signal TG1a representing the start timing of the DMA similarly to the aforementioned display processing unit 231, and the other three display processing units 230 are configured to acquire corresponding display image data in response to the trigger signal TG1a similarly to the aforementioned display processing unit 232. Furthermore, the output selection unit provided in the display processing device is configured to output the display-processed output image data output from the respective display processing units 230 in response to the number of the image signal input systems provided in the display device connected to the display processing device.

Furthermore, in the present embodiment, the case in which display image data to be displayed on the 4K-TV 310 that displays an image of the 4K2K (3840×2160) size is divided into odd and even columns, and two display processing units 230 (the display processing unit 231 and the display processing unit 232) provided in the display processing device 23 operate in cooperation with each other in a parallel manner has been described. However, a method for dividing display image data is not limited to the embodiment of the present invention. For example, a plurality of columns of the display image data to be displayed on the 4K-TV 310 are collected into a strip shape as one unit, and in each collected unit of strip shapes, the display image data can be divided into display image data configured in units of strip shapes in odd sequences and display image data configured in units of strip shapes in even sequences. Also in this case, similarly to the present embodiment, the display processing unit 231 can perform the display processing on the display image data configured in units of strip shapes in odd sequences and the display processing unit 232 can perform the display processing on the display image data configured in units of strip shapes in even sequences.

In addition, in this case, the output selection unit provided in the display processing device is considered to be configured to hold output image data of respective columns included in units collected in the strip shape until it is output at the timing of the display device clock. Furthermore, the output selection unit is considered to be configured to sequentially select the held output image data at the timing of the display device clock, and output the selected output image data to a connected display device. At this time, as a configuration for holding the output image data of the respective columns, for example, a configuration in which a latch circuit that temporarily holds output image data of each column included in units of strip shapes in odd sequences and output image data of each column included in units of strip shapes in even sequences is provided in the output selection unit 235 is considered. With such a configuration, for example, it is not necessary to completely synchronize the output timings of display-processed output image data by the display processing unit 231 and the display processing unit 232 with each other, so that it is possible to permit shift of timings at which the respective display processing units 230 perform the display processing by the number of columns included in respective units of strip shapes. In this way, in the present embodiment, the configuration in which the input control blocks in the respective display processing units 230 adjust the output timings of the display-processed output image data by the respective display processing units 230 provided in the display processing device 23 has been described. However, since there is a timing permissible by collecting a plurality of columns of the display image data in a strip shape, it is possible to further simplify the configuration of adjusting the output timing of the output image data. Furthermore, it is possible to further simplify the control of the timing at which the synchronization signal generation block 2311 in the display processing unit 231 outputs the trigger signal TG1a for causing the display processing unit 232 operating in cooperation to start the DMA.

In addition, in the case of performing the display processing in each unit in which the display image data of a plurality of columns have been collected, the display image data of respective columns can be simply collected, and, for example, boundary portions of the respective columns collected in each unit overlap each other, a so-called overlapping column can be provided. When such an overlapping column is provided, even though the display processing is separately performed for display image data of respective units, it is possible for joints of the respective units collectively divided in an image corresponding to display-processed output image data displayed on a display device to be less conspicuous.

Furthermore, in the present embodiment, the case in which the two display processing units 230 (the display processing unit 231 and the display processing unit 232) provided in the display processing device 23 operate in cooperation with each other in a parallel manner, thereby handling the display device that displays the (high definition) image of the 4K2K size (3840×2160) larger than the image of the corresponding full HD size (1920×1080) handled by each display processing unit 230, has been described. However, the size of an image that can be handled by a plurality of display processing units 230 provided in the display processing device and operating in cooperation with each other in a parallel manner is not limited to the embodiment of the present invention. That is, the concept of the present invention is applied in response to the configuration of the display processing unit 230 provided in the display processing device, so that it is possible to construct a configuration in which the display processing is performed on the high definition image, that is, an image with a larger size than the image of the 4K2K size (3840×2160).

Furthermore, in the present embodiment, a configuration of switching the first operation and the second operation in the display processing device 23 is not particularly specified. It may also be possible to employ a configuration in which the switching of the first operation and the second operation in the display processing device 23 is performed by, for example, a control unit (not shown) for controlling the entire imaging apparatus 1 employing the display processing device 23 according to the present embodiment, or a control unit (not shown) for controlling the entire image processing apparatus 20 mounted in the imaging apparatus 1 and including the display processing device 23 according to the present embodiment.

While preferred embodiments of the invention have been described and illustrated above, it should be understood that these are exemplary of the invention and are not to be considered as limiting. Additions, omissions, substitutions, and other modifications can be made without departing from the spirit or scope of the present invention. Accordingly, the invention is not to be considered as being limited by the foregoing description, and is only limited by the scope of the appended claims.

What is claimed is:

1. A display processing device that performs predetermined display processing on image data of a display image of a predetermined first size, the image data of the display image of the first size being input to the display processing device, the display processing device comprising:
 a first display processing unit that outputs image data of a first output image obtained by performing the display processing on display image data of an odd column of a display image of a second size larger than the first size, when the display image of the second size is input to the first display processing unit;
 a second display processing unit that outputs image data of a second output image obtained by performing the display processing on display image data of an even column of the display image of the second size;
 an output selection unit that selects the image data of the first output image or the image data of the second output image, and outputs the selected image data to a first display device that displays the display image of the second size; and
 a clock control unit that generates and supplies an operation clock required when the first display processing unit and the second display processing unit operate, wherein
 the first display processing unit includes:
  a first synchronization signal generation block that generates and outputs a synchronization signal required when the first display device displays an image corresponding to output image data output from the output selection unit, and generates and outputs a first trigger signal representing a first timing at which acquisition of the display image data of the odd column is started and a second trigger signal representing a second timing at which acquisition of the display image data of the even column is started, on the basis of the operation clock supplied from the clock control unit;
  a first input control block that acquires the display image data of the odd column in response to the first trigger signal; and
  a first display processing block that outputs the image data of the first output image obtained by performing the display processing on the display image data of the odd column acquired by the first input control block, and the second display processing unit includes:
a second synchronization signal generation block that generates a synchronization signal required when a second display device, which is handled by the second display processing unit independently, displays an image corresponding to output image data output from the second display processing unit, and generates and outputs a third trigger signal representing a third timing at which acquisition of the image data of the display image of the first size, which is handled by the second display processing unit independently, is started, on the basis of the operation clock supplied from the clock control unit;
a synchronization signal selection block that selects any one of the second trigger signal and the third trigger signal and outputs the selected trigger signal as a fourth trigger signal;
a second input control block that acquires the display image data of the even column or the image data of the display image of the first size, which is handled by the second display processing unit independently, in response to the fourth trigger signal; and
a second display processing block that outputs the display image data of the even column acquired by the second input control block or the image data of the second output image obtained by performing the display processing on the image data of the display image of the first size, which is handled by the second display processing unit independently.

2. The display processing device according to claim 1, wherein the first display processing unit acquires the display image data of the odd column by a direct memory access (DMA) and notifies the second display processing unit of a timing at which the display image data of the even column is acquired by the DMA.

3. The display processing device according to claim 2, wherein the clock control unit generates a display device clock of a frequency required when the first display device displays an image corresponding to one pixel, and generates the operation clock with the same phase as the generated display device clock.

4. The display processing device according to claim 3, wherein, on the basis of the synchronization signal output by the first display processing unit and corresponding to the first display device, the output selection unit determines a period in which the first display device displays an image, alternately selects the image data of the first output image and the image data of the second output image at each timing of the display device clock for the determined period in which the first display device displays the image, and outputs the selected image data to the first display device at a timing of the display device clock.

5. The display processing device according to claim 3, wherein, on the basis of the synchronization signal output by the first display processing unit and corresponding to the first display device, the output selection unit determines a period in which the first display device displays an image, simultaneously selects the image data of the first output image and the image data of the second output image at a timing of the operation clock for the determined period in which the first display device displays the image, and outputs the selected image data to respective corresponding input systems provided in the first display device at the timing of the operation clock.

6. An imaging apparatus including the display processing device according to claim 1.

7. A display processing device that performs predetermined display processing on image data of a display image of a predetermined first size, the image data of the display image of the first size being input to the display processing device, the display processing device comprising:
a first display processing unit that outputs image data of a first output image obtained by performing the display processing on display image data of an odd column of a display image of a second size larger than the first size, when the display image of the second size is input to the first display processing unit;
a second display processing unit that outputs image data of a second output image obtained by performing the display processing on display image data of an even column of the display image of the second size;
an output selection unit that selects the image data of the first output image or the image data of the second output image, and outputs the selected image data to a first display device that displays the display image of the second size; and
a clock control unit that generates and supplies an operation clock required when the first display processing unit and the second display processing unit operate, wherein the first display processing unit includes:
a first synchronization signal generation block that generates and outputs a synchronization signal required when the first display device displays an image corresponding to output image data output from the output selection unit, and generates and outputs a first trigger signal representing a first timing at which acquisition of the display image data of the odd column by a direct memory access (DMA) is started and a second trigger signal representing a second timing at which acquisition of the display image data of the even column by the DMA is started, on the basis of the operation clock supplied from the clock control unit;
a first input control block that acquires the display image data of the odd column by the DMA in response to the first trigger signal; and
a first display processing block that outputs the image data of the first output image obtained by performing the display processing on the display image data of the odd column acquired by the first input control block, and the second display processing unit includes:
a second synchronization signal generation block that generates a synchronization signal required when a second display device, which is handled by the second display processing unit independently, displays an image corresponding to output image data output from the second display processing unit, and generates and outputs a third trigger signal representing a third timing at which acquisition of the image data of the display image of the first size, which is handled by the second display processing unit independently, by the DMA is started, on the basis of the operation clock supplied from the clock control unit;
a synchronization signal selection block that selects any one of the second trigger signal and the third trigger signal and outputs the selected trigger signal as a fourth trigger signal;

a second input control block that acquires the display image data of the even column or the image data of the display image of the first size, which is handled by the second display processing unit independently, by the DMA in response to the fourth trigger signal; and a second display processing block that outputs the display image data of the even column acquired by the second input control block or the image data of the second output image obtained by performing the display processing on the image data of the display image of the first size, which is handled by the second display processing unit independently.

\* \* \* \* \*